United States Patent [19]
Hankawa

[11] Patent Number: 6,094,310
[45] Date of Patent: Jul. 25, 2000

[54] EYEPIECE SYSTEM HAVING WIDE VISUAL FIELD

[75] Inventor: Masashi Hankawa, Hachioji, Japan

[73] Assignee: Olympus Optical Co., Ltd., Tokyo, Japan

[21] Appl. No.: 09/236,477

[22] Filed: Jan. 25, 1999

Related U.S. Application Data

[63] Continuation-in-part of application No. 08/966,238, Nov. 7, 1997.

[30]     Foreign Application Priority Data

| Nov. 8, 1996 | [JP] | Japan | ................................. 8-311260 |
| Aug. 7, 1997 | [JP] | Japan | ................................. 9-224477 |
| Jan. 26, 1998 | [JP] | Japan | ................................. 10-026331 |

[51] Int. Cl.$^7$ .................................................. G02B 25/00
[52] U.S. Cl. ......................... 359/643; 359/644; 359/645; 359/646
[58] Field of Search ..................... 359/642–647

[56]             References Cited

U.S. PATENT DOCUMENTS

| 5,557,464 | 9/1996 | Imaizumi | ................................. 359/646 |
| 5,959,782 | 9/1999 | Hankawa | ................................. 359/643 |

FOREIGN PATENT DOCUMENTS

| 6-109983 | 4/1994 | Japan . |
| 6-175047 | 6/1994 | Japan . |
| 7-84195 | 3/1995 | Japan . |
| 8-5938 | 1/1996 | Japan . |
| 8-36140 | 2/1996 | Japan . |
| 8-76032 | 3/1996 | Japan . |

*Primary Examiner*—Hung Xuan Dang
*Assistant Examiner*—Michael A Lucas
*Attorney, Agent, or Firm*—Pillsbury Madison & Sutro LLP

[57]              ABSTRACT

An eyepiece system comprising, in order from the object side, a first lens unit having a negative refractive power and a second lens unit having a positive refractive power, and configured to locate an intermediate image formed by an objective lens system between the first lens unit and the second lens unit: the first lens unit being a negative lens unit having an object side surface which is convex toward the object side. This eyepiece system has a wide visual field and a long eye relief, and corrects aberrations favorably even at marginal portions of the visual field.

4 Claims, 8 Drawing Sheets

EYEPIECE SYSTEM HAVING WIDE VISUAL FIELD

This application is a continuation in part of Ser. No. 08/966,238 filed on Nov. 7, 1997.

BACKGROUND OF THE INVENTION a) Field of the Invention

The present invention relates to an eyepiece system having a wide visual field which is to be used in combination with objective lens systems such as those of binoculars and so on.

b) Description of the Prior Art

As conventional examples of eyepiece systems which have wide visual fields, there are known eyepiece systems having apparent visual fields of 80° which are disclosed by Japanese Patents Kokai Publication No. Hei 8-76032, No. Hei 8-36140, etc., an eyepiece system having an apparent visual field of 75° which is disclosed by Japanese Patent Kokai Publication No. Hei 8-5938, an eyepiece system having an apparent visual field of 65° which is disclosed by Japanese Patent Kokai Publication No. Hei 6-175047, and an eyepiece system having an apparent visual field of 72° disclosed by Japanese Patent Kokai Publication No. Hei 6-109983.

When an attempt is made to configure an eyepiece system so as to have a wide visual field and a long eye relief (a distance on an optical axis as measured from a surface of the eyepiece system located on the eye side to an eye point thereof), the eyepiece system has a large outside diameter, thereby aggravating aberrations. Since images can be eclipsed more hardly as an exit pupil diameter is larger, it is desirable that an eyepiece system which has a wide field angle in particular has a large exit pupil diameter for observing images which are not eclipsed even at marginal portions of a visual field.

Out of the conventional examples mentioned above, the eyepiece system disclosed by Japanese Patent Kokai Publication No. Hei 8-76032 has the wide apparent visual field of 80° and an eye relief which is long as compared with a focal length of the eyepiece system as a whole. However, this eyepiece system as a whole has a short focal length, thereby narrowing an airspace to be reserved between an objective lens system and the eyepiece system. When this eyepiece system is combined with an objective lens system which has a large aperture for enlarging an exit pupil diameter, the eyepiece system hardly allows a sufficient optical axis length to be reserved for a prism, of a roof prism type in particular requiring a long optical path length, which is to be disposed between the objective lens system and the eyepiece system.

When the focal length of this conventional example is prolonged for obtaining a long prism length in this conventional example, the eye relief is prolonged with the apparent visual field kept unchanged, whereby the eyepiece system has an enlarged outside diameter and makes it difficult to reserve a minimum eye-to-eye width required for binoculars.

Further, the eyepiece system disclosed by Japanese Patent Kokai Publication No. Hei 8-36140 has the apparent visual field of 80° and a long eye relief of 0.97f (f represents a focal length of the eyepiece system as a whole). However, this eyepiece system has a large outside diameter due to a fact that a lens component disposed on the eye side in this eyepiece system is a cemented lens component which is composed of a negative lens element and a positive lens element, and the cemented lens component has a positive refractive power which is weak. Accordingly, this eyepiece system makes it difficult, like the eyepiece system disclosed by Japanese Patent Kokai Publication No. Hei 8-76032, to reserve the minimum eye-to-eye distance required for binoculars when its focal length is prolonged for reserving a space for disposing a prism.

The eyepiece system disclosed by Japanese Patent Kokai Publication No. Hei 8-5938 has the apparent visual field of 75° and favorably corrects aberrations such as curvature of field. However, this eyepiece system also has a small exit pupil diameter and is obliged to be said as an insufficient eyepiece system. Further, this eyepiece system uses, like the eyepiece system disclosed by Japanese Patent Kokai Publication No. Hei 8-36140 mentioned above, uses a cemented lens component which consists of a negative lens element and a positive lens element on the eye side and has a weak refractive power, thereby having a large outside diameter.

The eyepiece system disclosed by Japanese Patent Kokai Publication No. Hei 6-175047 has the apparent visual field of 65° and uses a first lens unit which is disposed on the object side of an intermediate image surface and has a strong refractive power, whereby this eyepiece system must use positive lens components having strong refracting powers for composing a second lens unit. When an attempt is made to further widen the apparent visual field, the positive lens components must be thickened for reserving required marginal thicknesses, thereby increasing a weight of the eyepiece system, disturbing images at marginal portions of a visual field and making it difficult to correct aberrations favorably.

Furthermore, the eyepiece system disclosed by Japanese Patent Kokai Publication No. Hei 6-109983 has the apparent visual field of 72° and a short focal length like each of the conventional examples described above, and is therefore insufficient for reserving a large pupil diameter. When an attempt is made to prolong a focal length of this eyepiece system, an eye relief is prolonged with the apparent visual field kept unchanged, thereby enlarging an outside diameter of the eyepiece system.

The conventional eyepiece systems cannot have extremely large apparent visual fields and large pupil diameters as described above though these eye piece systems corrects aberrations favorably even at marginal portions of the visual fields.

Furthermore, a maximum diameter of an eyepiece system constitutes an important factor when the eyepiece system has an extremely wide visual field on the order of 80°.

FIG. 9 is a diagram schematically showing relationship between an eye relief and a diameter of an eyepiece system. When two eyepiece systems which have the same apparent visual field α are compared with each other, one which has a higher ratio of an eye relief ER relative to is a maximum diameter DM of the eyepiece system (a product of an eye relief multiplied by an inverse number of a maximum diameter of the eyepiece system) can be said as compact as seen from the drawing. In the drawing, the reference symbol E represents an eyepiece.

In addition to the eyepiece systems described above, an eyepiece system disclosed by Japanese Patent Kokai Publication No. Hei 7-84195 is known a conventional example of eyepiece system which has an extremely wide apparent visual field on the order of 80°. Though this eyepiece system has the apparent visual field on the order of 80°, it has a ratio on the order of 0.37 between an eye relief and a maximum diameter of the eyepiece system, and cannot be said as a sufficiently compact eyepiece system.

Moreover, an eyepiece system disclosed by Japanese Patent Kokai Publication No. Hei 8-36140 has a low ratio between an eye relief and a maximum diameter of the eyepiece system which is on the order of 0.3, and a small outside diameter when an eye relief is on the order of 11 mm as in an embodiment described in the bulletin of the patent. However, the eye relief of 11 mm is insufficient for favorable observation. When an attempt is made to prolong the eye relief, the eyepiece system has an outside diameter which is rather large. Further, it cannot be said that astigmatism and distortion are corrected sufficiently in this eyepiece system.

In addition, an eyepiece system disclosed by Japanese Patent Kokai Publication No. Sho 8-76032 has a high ratio between an eye relief and a maximum diameter of the eyepiece system which is on the order of 0.5, but cannot reserve a sufficient amount of marginal rays at an apparent visual field of 80° due to insufficient marginal thicknesses (thicknesses of marginal portions of lens components). Further, this conventional example has an eye relief on the order of 15 mm on an optical axis, but uses a lens surface having high curvature on the eye side, thereby making a substantial eye relief shorter than 13 mm which is not sufficient.

As understood from the foregoing description, the conventional eyepiece systems which have super wide visual fields have apparent visual fields on the order of 80°, and can hardly correct curvature of field, astigmatism and distortion favorably while reserving a long eye relief which is substantially 15 mm or longer.

SUMMARY OF THE INVENTION

A primary object of the present invention is to provide an eyepiece system which has an apparent visual field on the order of 80° and a sufficient eye relief, can cope with a large pupil diameter and corrects aberrations favorably even at marginal portions of the visual field.

Another object of the present invention is to provide an eyepiece system which has a ratio of an eye relief relative to a maximum diameter of the eyepiece system on the order of 0.4, and a small outside diameter.

The eyepiece system according to the present invention is a lens system which is composed, in order from the object side toward an observer, of a first lens unit having a negative refractive power and a second lens unit having a positive refractive power, configured so as to locate an intermediate image formed by an objective lens system between the first lens unit and the second lens unit, and characterized in that the first lens unit is a negative lens unit which has a convex surface on the object side and satisfies the following conditions (1) and (2):

$15 \text{ (mm)} < f_{2e} < 2.8f$ (1)

$-0.25 < f/f_1 < 0$ (2)

The eyepiece system according to the present invention which has another composition is composed, in order from the object side, of a first lens unit having a negative refractive power and a second lens unit having a positive refractive power, configured so as to locate an image formed by an objective lens system between the first lens unit and the second lens unit, and characterized in that the second lens unit is composed of a first lens component which comprises a positive meniscus lens element having a concave surface on the object side and at least one positive lens element, and has a positive refractive power as a whole, a second lens component which comprises a cemented lens component consisting of a negative lens element and a positive lens element, and has a positive refractive power as a whole, a third lens component which comprises a positive lens element having an object side surface having strong refractive power and has a positive refractive power as a whole.

DETAILED DESCRIPTION OF THE PREFERRED EMBODIMENTS

Figure 1:
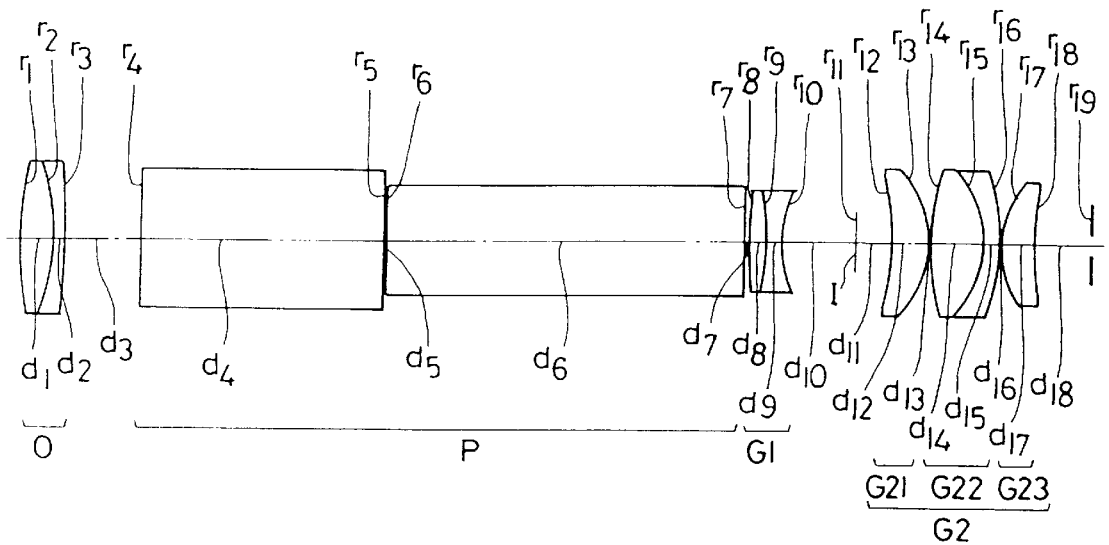
FIGS. 1 through 8 show sectional views illustrating compositions of first through eighth embodiments of the eyepiece system according to the present invention.

The eyepiece system according to the present invention which has a first composition is a lens system having a composition illustrated in anyone of FIGS. 1 through 4, or is a lens system which is composed, in order from the object side toward an observer, of a first lens unit $G_1$ having a negative refractive power and a second lens unit $G_2$ having a positive refractive power, configured so as to locate an intermediate image formed by an objective lens system between the first lens unit $G_1$ and the second lens unit $G_2$, and characterized in that the first lens unit $G_1$ is a negative lens unit having a convex surface on the object side, and satisfies the following conditions (1) and (2):

$15 \text{ (mm)} < f_{2e} < 2.8f$ (1)

$-0.25 < f/f_1 < 0$ (2)

wherein the reference symbol f represents a focal length of the eyepiece system as a whole, the reference symbol $f_{2e}$ designates a focal length of a lens element or a cemented lens component which is disposed on the side of the observer in the second lens unit and the reference symbol $f_1$ denotes a focal length of the first lens unit.

The eyepiece system according to the present invention is configured so as to suppress a Petzval's sum which governs curvature of field at a low level by configuring the first lens unit $G_1$ as the negative lens unit which has a diverging function. Further, the first lens unit $G_1$ is configured to spring up marginal rays (refract the rays so as to have large heights) for reasonably obtaining an eyepiece system which has a wide visual field. Furthermore, curvature of field which tends to be remarkable in the negative direction is corrected by configuring an object side surface of the first lens unit $G_1$ as a surface which is convex toward the object side.

Further, the eyepiece system according to the present invention is configured to lead a light bundle which is diverged by the first lens unit $G_1$ to an eye point by a converging function of the second lens unit $G_2$ having the positive refractive power.

Furthermore, the condition (1) mentioned above defines a refractive power of a third lens component $G_{23}$ which is a single lens element or a cemented lens component disposed on the image side in the second lens unit. If the lower limit of 15 mm of the condition (1) is exceeded, the eyepiece system will have a focal length which is shorter than an eye relief thereof and the lens component $G_{23}$ will have a power stronger than required, thereby making it difficult to correct offaxial aberrations. If the upper limit of 2.8f of the condition (1) is exceeded, the lens component $G_{23}$ disposed on the observer side (eye side) will have a weak refractive power, thereby enlarging an outside diameter of the eyepiece system. When the condition (1) is satisfied, burdens of positive powers on other lens components of the second lens unit $G_2$ are lessened and there is obtained an advantage for correction of chromatic aberration.

The condition (2) defines a refractive power of the first lens unit $G_1$, thereby defining heights of rays incident on the second lens unit $G_2$ and is required to reserve a space for disposing prisms. If the lower limit of −0.25 of the condition (2) is exceeded, the first lens unit $G_1$ will have a strong refractive power and rays travelling toward the second lens unit $G_2$ will have large angles, thereby resulting in enlargement of an outside diameter of the second lens unit $G_2$. In case of a binocular which corresponds to a large pupil diameter in particular, it will be difficult to reserve a minimum eye-to-eye distance, thereby making it impossible to compose the binocular. Further, an airspace to be reserved between an objective lens system and the first lens unit $G_1$ will be narrowed, thereby making it difficult to reserve a space for disposing prisms. If the upper limit of 0 of the condition (2) is exceeded, in contrast, the first lens unit $G_1$ will have a converging function and a large outside diameter, thereby making it difficult to reserve a space for disposing prisms P. Further, an airspace to be reserved between an objective lens system O and the first lens unit $G_1$ will be widened, thereby enlarging the binocular as a whole.

The eyepiece system for binoculars according to the present invention which has a second composition is composed as shown in any one of FIGS. 1 through 4, or is a lens system which is composed, in order from the object side toward the observer, of a first lens unit $G_1$ having a negative refractive power and a second lens unit $G_2$ having a positive refractive power, configured so as to locate an intermediate image formed by an objective lens system between the first lens unit $G_1$ and the second lens unit $G_2$, and characterized in that the first lens unit $G_1$ has an object side surface which is convex toward the object side, and satisfies the following conditions (3) and (2-1):

$$d/f < 2.3 \quad (3)$$

$$-0.2 < f/f_1 < 0 \quad (2\text{-}1)$$

wherein the reference symbol d represents an airspace reserved between the first lens unit $G_1$ and the second lens unit $G_2$.

The eyepiece system according to the present invention which has the second composition is configured so as to correct curvature of field by adopting the surface which is convex toward the object side as the object side surface of the first lens unit $G_1$ and favorably correct lateral chromatic aberration by composing the first lens unit $G_1$ of a combination of a positive lens element and a negative lens element.

The condition (3) defines an airspace to be reserved between the first lens unit $G_1$ and the second lens unit $G_2$. If the upper limit of 2.3 of the condition (3) is exceeded, the airspace between the first lens unit and the second lens unit will be widened, thereby enlarging an outside diameter of the second lens unit.

The condition (2-1) defines a refractive power of the first lens unit $G_1$. For the eyepiece system according to the present invention which has the second composition, it is preferable to satisfy the condition (2-1) in place of the condition (2). If the lower limit of −0.2 of the condition (2-1) is exceeded, the first lens unit $G_1$ will have a strong refractive power, thereby resulting in enlargement of the outside diameter of the second lens unit $G_2$. Further, offaxial rays will have large angles of incidence, thereby making it difficult to correct aberrations. If the upper limit of 0 of the condition (2-1) is exceeded, the first lens unit $G_1$ will have a converging function and a large outside diameter, thereby making it difficult to reserve a space for disposing prisms.

When the eyepiece system according to the present invention which has the second composition is configured so as to satisfy the conditions described above, lens components of the second lens unit $G_2$ are capable of leading a light bundle to an eye point while favorably correcting aberrations.

Further, the eyepiece system according to the present invention which has a third composition is composed similarly to the eyepiece system which has the first composition, and configured so as to satisfy the conditions (1), (3) and (2-1) mentioned below, thereby making it possible to adjust an eye-to-eye distance while reserving a sufficient pupil diameter and obtain binoculars having wide apparent visual fields on the order of 80°:

$$15 \text{ (mm)} < f_{2e} < 2.8f \quad (1)$$

$$d/f < 2.3 \quad (2)$$

$$-0.2 < f/f_1 < 0$$

It is more desirable to configured the eyepiece system according to the present invention which has the first or third composition so as to satisfy, in place of the condition (1), the following condition (1-1):

$$f < f_{2e} < 2.3f \quad (1\text{-}1)$$

For the eyepiece system which has the first composition or the eyepiece system which has the second or third composition, it is more desirable to satisfy, in place of the condition (2) or the condition (2-1), the following condition (2-2):

$$-0.13 < f/f_1 < -0.04 \quad (2\text{-}2)$$

For the eyepiece system according to the present invention which has the second or third composition, it is more desirable to satisfy, in place of the condition (3), the following condition (3-1):

$$1 < d/f < 2.3 \quad (3\text{-}1)$$

For the eyepiece system which has the first, second or third compositions described above, it is desirable to compose the second lens unit $G_2$, in order from the object side, of a first lens component $G_{21}$, a second lens component $G_{22}$ and a third lens component $G_{23}$ each having a positive refractive power, and configure the second lens component $G_{22}$ as a cemented lens component having a biconvex shape.

By composing the second lens unit $G_2$ of the eyepiece system according to the present invention of the three lens components which have positive refractive powers as described above, it is possible to reduce an outside diameter of the eyepiece system while favorably correcting aberrations. Further, lateral chromatic aberration can be favorably corrected by configuring the second lens component $G_{22}$ as a cemented lens component which has convex surfaces on both sides.

For favorably correcting curvature of field and coma in the eyepiece system according to the present invention which has the first, second or third composition, it is desirable to satisfy the following condition (4):

$$0 < f/r_e < 0.65 \tag{4}$$

wherein the reference symbol $r_e$ represents a radius of curvature on a surface of the second lens unit which is disposed on the side of the observer.

The condition (4) defines the radius of curvature $r_e$ on the observer side surface of the eyepiece system. Though the condition (4) exhibits a low effect for an eyepiece system which has a narrow visual field, curvature of field and coma can be corrected favorably by satisfying the condition (4) in an eyepiece system having an extremely wide visual field such as the eyepiece system according to the present invention which has an apparent visual field of 80°.

If the lower limit of 0 of the condition (4) is exceeded, the observer side surface will be planar or convex and an image surface will be curved toward the negative direction, thereby producing a disadvantage for correction of coma. If the upper limit of 0.65 of the condition (4) is exceeded, the radius of curvature on the observer side surface will be too short and the image surface will be curved toward the positive direction, thereby producing a disadvantage for correction of coma and other aberrations, and making it hard to reserve a sufficient eye relief.

Further, it is possible to correct curvature of field and coma more favorably by configuring the eyepiece system so as to satisfy, in place of the condition (4), the following condition (4-1):

$$0.1 < f/r_e < 0.3 \tag{4-1}$$

Furthermore, it is possible to effectively correct aberrations, curvature of a meridional image surface in particular, by using a positive meniscus lens component which has a convex surface on the observer side as the first lens component $G_{21}$ of the second lens unit $G_2$ and configuring the observer side surface as an aspherical surface. In this case, the aspherical lens component can be manufactured at a low cost by selecting a resin optical material for the aspherical lens component.

The eyepiece system according to the present invention which has a fourth composition is composed, in order from the object side as shown in FIGS. 5 through 8, of a first lens unit $G_1$ having a negative refractive power and a second lens unit $G_2$ having a positive refractive power, configured so as to locate an intermediate image surface between the first lens unit $G_1$ and the second lens unit $G_2$, and characterized in that the second lens unit $G_2$ is composed of a first lens component $G_21$ which comprises a positive meniscus lens element having a concave surface on the object side and at least one positive lens element, and has a positive refractive power as a whole, a second lens component $G_{22}$ which comprises a cemented lens component consisting of a negative lens element and a positive lens element, and has a positive refractive power as a whole, and a third lens component $G_{23}$ which comprises a positive lens element having an object side surface having a strong refractive power and has a positive refractive power as a whole.

The eyepiece system according to the present invention is configured to reduce a Petzval's sum and correct curvature of field by configuring the first lens unit $G_1$ as a lens unit having a negative refractive power, and at the same time impart a function for thinning a light bundle between an objective lens system and the intermediate image surface (lowering heights of rays) to the first lens unit $G_1$. The thinning of the light bundle between the objective lens system and the intermediate image surface makes it possible to reduce a volume of an image erecting prism to be disposed between the objective lens system, thereby contributing to compacter designs and reduction of weights of binoculars and other optical instruments.

Furthermore, the positive meniscus lens element which has the concave object side surface and is disposed in the first lens component $G_{21}$ of the second lens unit $G_2$ serves for correcting curvature of field and functions, in cooperation with the positive lens element disposed on the eye side thereof, to prevent marginal rays from being farther from an optical axis, thereby permitting reducing an outside diameter of the eyepiece system.

Moreover, the outside diameter of the eyepiece system is kept short by configuring the second lens component $G_{22}$ of the second lens unit $G_2$ so that it comprises the cemented lens component consisting of the negative lens element and the positive lens element, and has the positive refractive power as a whole, thereby preventing the marginal rays from being farther from the optical axis while effectively correcting lateral chromatic aberration.

The marginal rays are largely refracted for obtaining a wide apparent visual field by configuring the third lens component $G_{23}$ of the second lens unit $G_2$ so as to comprise the positive lens element which has the object side surface having the strong refractive power and have the positive refractive power as a whole.

For further enhancing optical performance of the eyepiece system according to the present invention described above, it is desirable to configure at least one of lens surfaces as an aspherical surface.

In case of an eyepiece system which has an extremely wide apparent visual field like that according to the present invention, a remarkable effect for correcting curvature of field and pupil aberrations in particular by using an aspherical surface on a lens element.

The image surface of the eyepiece system according to the present invention can be flattened as described above by the first lens unit and the positive meniscus lens element having the concave surface on the object side which is disposed in the second lens unit. When an attempt is made to further flatten the image surface only with spherical lens elements, however, the image surface may be overcorrected at most marginal portions thereof. Even in such a case, it is possible to flatten the image surface using an aspherical surface. It is desirable that an aspherical surface to be used in this case has such a shape as to weaken a refractive power as portions of the aspherical surface are farther from the optical axis. Further, it is desirable that the aspherical surface is disposed in the second lens unit in which light bundles having different field angles are separated as far as possible from one another. It is desirable to dispose the aspherical surface on the first lens component $G_{21}$ of the second lens unit $G_2$. When a lens component which is to have an aspherical surface is to be made of a plastic material for reduction of a manufacturing cost, it is desirable to configure the lens component not as a cemented lens component but as a single lens element.

In addition, it is desirable to configure the eyepiece system according to the present invention which has the composition described above so as to satisfy the following conditions:

$$0.2 < f_2/f_{21} < 0.6 \tag{5}$$

$$0.35 < f_2/f_{23} < 0.55 \tag{6}$$

$$-3.0 < f \cdot \phi < -0.4 \tag{7}$$

$$v_{22a} - v_{22b} - 25.0 \tag{8}$$

$$n_{23} > 1.65 \tag{9}$$

wherein the reference symbol $f_2$ represents a focal length of the second lens unit $G_2$, the reference symbol $f_{21}$ designates a focal length of the first lens component $G_{21}$ disposed in the second lens unit, the reference symbol $f_{23}$ denotes a focal length of the third lens component $G_{23}$ of the second lens unit, the reference symbol f represents a focal length of the eyepiece system as a whole, the reference symbol φ designates a refractive power of an air lens formed between the first lens unit $G_1$ and the second lens unit $G_2$, the reference symbol $v_{22a}$ represents an Abbe's number of the negative lens element of the second cemented lens component $G_{22}$ disposed in the second lens unit, the reference symbol $v_{22b}$ designates an Abbe's number of the positive lens element of the second cemented lens component $G_{22}$ disposed in the second lens unit, and the reference symbol $n_{23}$ denotes a refractive index of the positive lens element which has the object side surface having the strong refractive power and is disposed in the third lens component $G_{23}$ of the second lens unit.

The condition (5) defines a ratio $f_2/f_{21}$ of the focal length of the second lens unit $G_2$ relative to the focal length of the first lens component $G_{21}$ disposed in the second lens unit. This condition substantially defines a power distribution for the first lens component $G_{21}$ disposed in the second lens unit. If $f_2/f_{21}$ has a value which is smaller than the lower limit of 0.2 of the condition (5), the first lens -component $G_{21}$ will have a weak power and marginal rays will be farther from the optical axis, thereby undesirably obliging to enlarge an outside diameter of the eyepiece system. If $f_2/f_{21}$ has a value which is larger than the upper limit of 0.6 of the condition (5), the first lens component $G_{21}$ will have too strong a power and aggravate aberrations at marginal portions in particular, thereby making it difficult to correct aberrations with the other lens unit or lens components.

It is more desirable to configure the eyepiece system according to the present invention so as to satisfy, in place of the condition (5), the following condition (5-1):

$$0.25 < f_2/f_{21} < 0.5 \tag{5-1}$$

The condition (6) defines a ratio $f_2/f_{23}$ of the focal length of the second lens unit $G_2$ relative to the focal length of the third lens component $G_{23}$ disposed in the second lens unit. In other words, the condition (6) defines a power distribution for the third lens component $G_{23}$ disposed in the second lens unit $G_2$. If $f_2/f_{23}$ has a value which is smaller than the lower limit of 0.35 of the condition (6), the third lens component $G_{23}$ will have a weak power, thereby making it difficult to lead marginal rays to the eye point and obtain a wide apparent visual field. If $f_2/f_{23}$ has a value which is larger than the upper limit of 0.55 of the condition (6), in contrast, the third lens component $G_{23}$ disposed in the second lens unit will have too strong a power and produce aberrations in large amounts which can hardly be corrected by the other lens unit or lens components.

It is desirable to configure the eyepiece system according to the present invention so as to satisfy, in place of the condition (6), the following condition (6-1):

$$0.4 < f_2/f_{23} < 0.5 \tag{6-6}$$

The condition (7) defines f·φ which is a product of the focal length f of the eyepiece system as a whole multiplied by the powers of the air lens formed between the first lens unit $G_1$ and the second lens unit $G_2$, or substantially defines the power φ of the air lens formed between the first lens unit $G_1$ and the second lens unit $G_2$. If f·φ has a value which is smaller than the lower limit of −3.0 of the condition (7), the air lens will have too strong a power and aggravate aberrations at marginal portions in particular. If f·φ has a value which is larger than the upper limit of −0.4 of the condition (7), the air lens will have too weak a power and enlarge a Petzval's sum, thereby making it difficult to correct curvature of field.

Further, it is more desirable to configure the eyepiece system according to the present invention so as to satisfy, in place of the condition (7), the following condition (7-1):

$$-2.0 < f \cdot \phi < -0.5 \tag{7-1}$$

The condition (8) defines a difference between Abbe's numbers of the negative lens element and the positive lens element of the second lens component $G_{22}$ disposed in the second lens unit. If the difference between the Abbe's numbers $v_{22a} - v_{22b}$ is larger than the upper limit of −25.0 of the condition (8), the cemented lens component will produce lateral chromatic aberration in a large amount, thereby making it impossible to correct color blurring on marginal images.

It is more desirable to configure the eyepiece system according to the present invention so as to satisfy, in place of the condition (8), the following condition (8-1):

$$v_{22a} - v_{22b} < -30.0 \tag{8-1}$$

The condition (9) defines a refractive index of the positive lens element which has the object side surface having the strong refractive power disposed in the third lens component $G_{23}$ of the second lens unit. If the refractive power $n_{23}$ of the positive lens element has a value which is smaller than the lower limit of 1.65 of the condition (9), the positive lens element cannot maintain a strong refractive power, thereby making it difficult to obtain an extremely wide apparent visual field.

It is more desirable to satisfy, in place of the condition (9), the following condition (9-1):

$$n_{23} > 1.70 \tag{9-1}$$

It is further desirable to satisfy, in place of the condition (9) or (9-1), the following condition (9-2):

$$) n_{23} > 1.75 \tag{9-2}$$

It is desirable to use at least one aspherical surface in the eyepiece system according to the present invention which satisfies each of the conditions described above.

For the eyepiece system described above, is desirable to satisfy the following conditions (10) and (11):

$$-3.0 < \{(\phi_{22a}/v_{22a})/(\phi_{22b}/v_{22b})\} < -1.01 \tag{10}$$

$$0.10 < \phi_{22} \cdot f < 0.40 \tag{11}$$

wherein the reference symbol $\phi_{22}$ represents a refractive power of the second lens component disposed in the second lens unit, the reference symbol $\phi_{22a}$ designates a refractive power of the negative lens element of the cemented lens component disposed as the second lens component in the second lens unit and the reference symbol $\phi_{22b}$ denotes a refractive power of the positive lens element of the cemented lens component disposed as the second lens component in the second lens unit.

The condition (10) defines a ratio of an amount of chromatic aberration to be produced by the negative lens element of the cemented lens component disposed as the second lens component in the second lens unit relative to an amount of chromatic aberration to be produced by the positive lens element of the cemented lens component disposed as the second lens component in the second lens unit. This condition signifies that the cemented lens component used as the second lens component in the second lens unit produces chromatic aberration in a smaller amount as the ratio is closer to −1. In order to correct chromatic aberration favorably in the cemented lens component as a whole, however, it is not preferable to configure the cemented lens component so as to produce no chromatic aberration at all since it is impossible in such a case to correct chromatic aberration which is produced by the other lens component of the second lens unit.

When the negative lens element of the cemented lens component produces chromatic aberration in an amount on the order to satisfy the condition (10), it is possible to correct chromatic aberration favorably in the eyepiece system as a whole.

If chromatic aberration is produced in an amount smaller than the lower limit of the condition (10), the negative lens element of the cemented lens component used as the second lens component in the second lens unit will produce chromatic aberration in too large an amount, whereby chromatic aberration will be excessive even when cancellation with chromatic aberration produced by the other lens components is taken into consideration.

If the ratio mentioned above has a value exceeding the upper limit of the condition (10), the cemented lens component used as the second lens component of the second lens unit will produce chromatic aberration in too small an amount, thereby having the effect too low for correcting chromatic aberration produced by the other lens components.

The condition (11) defines a value of a product of the refractive power of the cemented lens component disposed in the second lens unit multiplied by a focal length of the eyepiece system as a whole.

If the product has a small value exceeding the lower limit of the condition (11), the second lens unit disposed in the second lens unit will have a weak refractive power and a low function to refract offaxial rays, thereby making it impossible to reduce an outside diameter of the lens component.

If the product has a large value exceeding the upper limit of 0.40 of the condition (11), the second lens component disposed in the second lens unit will have a strong refractive power and too high a function to refract the offaxial rays, thereby making it difficult to correct offaxial aberrations.

Furthermore, it is desirable that the eyepiece system according to the present invention to satisfy the following conditions (12) and (13):

$$\alpha_{22a} - \alpha_{22b} < 30 \tag{12}$$

$$1.65 < \text{AVE}(n_{22a}, n_{22b}) < 1.93 \tag{13}$$

wherein the reference symbol $\alpha_{22a}$ represents a mean linear expansion coefficient of negative lens element of the cemented lens component used as the second lens component of the second lens unit, the reference symbol $\alpha_{22b}$ designates a mean linear expansion coefficient of the positive lens element of the cemented lens component used as the second lens component of the second lens unit, the reference symbol $n_{22a}$ denotes a refractive index of the negative lens element of the cemented lens component used as the second lens component of the second lens unit, the reference symbol $n_{22b}$ represents a refractive index of the positive lens element of the cemented lens component used as the second lens component of the second lens unit, and the reference symbol AVE ($n_{22a}$, $n_{22b}$) designates a mean value of the refractive indices $n_{22a}$ and $n_{22b}$ of the negative lens element and the positive lens element of the cemented lens component used as the second lens component of the second lens unit.

The condition (12) mentioned above defines a difference between the mean linear expansion coefficients of the negative lens element and the positive lens element of the cemented lens component used as the second lens component of the second lens unit. If the upper limit of 30 of the condition (12) is exceeded, cemented surfaces will easily separate from each other after cementing an optical system which has a large apparent visual field, etc. in particular. A mean linear expansion coefficient is a value which indicates elongation per temperature determined by measuring elongation of a sample and temperatures while heating it at a constant rate of 4° C. per minute, and signifies a mean linear expansion coefficient of $10^{-7}/°C$. at +100° C. to +300° C. or a coefficient corresponding to it.

Furthermore, the condition (13) defines a mean value of the refractive index $n_{22a}$ of the negative lens element and the refractive index $n_{22b}$ of the positive lens element of the cemented lens component used as the second lens component of the second lens unit. If the mean value is smaller than the lower limit of 1.65 of the condition (13), radii of curvature on refracting surfaces must be shortened to reserve a required refractive power for the cemented lens component used as the second lens component of the second lens unit, thereby making it difficult to correct offaxial aberrations, or lateral chromatic aberration and astigmatism in particular. If the upper limit of 1.9 of the condition (13) is exceeded, no glass material is usable, whereby the eyepiece system has no practical utility.

For reducing a fear of the separation of the cemented surfaces, it is more preferable to configure the eyepiece system so as to satisfy, in place of the condition (12), the following condition (12-1) shown below. This condition is effective in particular for an eyepiece system which has an apparent visual field exceeding 70°.

$$a_{22a} - a_{22b} < 23 \tag{12-1}$$

Furthermore, it is desirable to configure the eyepiece system according to the present invention so as to satisfy the following condition (2-3):

$$-0.25 < f/f_1 < -0.05 \tag{2-3}$$

wherein the reference symbol $f_1$ represents a focal length of the first lens unit.

The condition (2-3) defines a focal length of the first lens unit, and is required for correcting offaxial aberrations in the eyepiece system according to the present invention and configuring the lens system compact.

If the lower limit of −0.25 of the condition (2-3) is exceeded, the first lens unit will have too strong a refractive power, thereby resulting in enlargement of an outside diameter of the second lens unit, and offaxial rays will have large angles of incidence on the second lens unit which are not preferable for correction of aberrations. If the upper limit of −0.05 of the condition (2-3) is exceeded, in contrast, the first lens unit will have too weak a refractive power and a large outside diameter, and a light bundle which has a large diameter will pass through the prism, thereby making it difficult to configure the prism compact and aggravating curvature of field.

| Embodiment 1 |
| --- |

$f = 23.323$, $2\omega = 80°$, pupil diameter 6 mm
$r_1 = 114.1340$
    $d_1 = 10.2575$    $n_1 = 1.51633$    $\nu_1 = 64.15$
$r_2 = -76.5130$
    $d_2 = 3.5274$    $n_2 = 1.62004$    $\nu_2 = 36.26$
$r_3 = -267.3670$
    $d_3 = 23.3723$
$r_4 = \infty$
    $d_4 = 76.5700$    $n_3 = 1.56883$    $\nu_3 = 56.33$
$r_5 = \infty$
    $d_5 = 1.0000$
$r_6 = \infty$
    $d_6 = 110.7480$    $n_4 = 1.56883$    $\nu_4 = 56.33$
$r_7 = \infty$
    $d_7 = 1.5000$
$r_8 = 184.8210$
    $d_8 = 5.3397$    $n_5 = 1.80518$    $\nu_5 = 25.43$
$r_9 = -79.4570$
    $d_9 = 4.5842$    $n_6 = 1.51633$    $\nu_6 = 64.15$
$r_{10} = 39.3700$
    $d_{10} = 23.0322$
$r_{11} = \infty$ (intermediate image)
    $d_{11} = 11.9133$
$r_{12} = -81.9257$
    $d_{12} = 11.4015$    $n_7 = 1.49241$    $\nu_7 = 57.66$
$r_{13} = -29.4032$ (aspherical surface)
    $d_{13} = 0.5000$
$r_{14} = 81.9249$
    $d_{14} = 16.8972$    $n_8 = 1.60311$    $\nu_8 = 60.68$
$r_{15} = -32.5702$
    $d_{15} = 4.6652$    $n_9 = 1.76182$    $\nu_9 = 26.52$
$r_{16} = -65.0980$
    $d_{16} = 0.5000$
$r_{17} = 31.5835$
    $d_{17} = 10.0400$    $n_{10} = 1.77250$    $\nu_{10} = 49.60$
$r_{18} = 101.0040$
    $d_{18} = 17.5000$
$r_{19} = \infty$ (eye point)
aspherical surface coefficients
$K = 0$, $E = 5.1367 \times 10^{-6}$, $F = -2.8994 \times 10^{-9}$,
$G = 3.5052 \times 10^{-12}$
$f_1 = -213.411$, $f_2 = 25.300$, $F_{2e} = 55.959$, $d = 34.9455$,
$r_e = 101.004$, $f_{2e}/f = 2.399$, $f/f_1 = -0.109$, $d/f = 1.498$,
$f/r_e = 0.231$

| Embodiment 2 |
| --- |

$f = 22.906$, $2\omega = 80°$, pupil diameter 6 mm
$r_1 = 114.0424$
    $d_1 = 10.2571$    $n_1 = 1.51633$    $\nu_1 = 64.15$
$r_2 = -76.4366$
    $d_2 = 3.5262$    $n_2 = 1.62004$    $\nu_2 = 36.26$
$r_3 = -272.3704$
    $d_3 = 31.4642$
$r_4 = \infty$
    $d_4 = 72.6750$    $n_3 = 1.56883$    $\nu_3 = 56.33$
$r_5 = \infty$
    $d_5 = 2.0500$
$r_6 = \infty$
    $d_6 = 100.6800$    $n_4 = 1.56883$    $\nu_4 = 56.33$
$r_7 = \infty$
    $d_7 = 1.5000$
$r_8 = 164.2153$
    $d_8 = 5.3390$    $n_5 = 1.80518$    $\nu_5 = 25.43$
$r_9 = -85.4978$
    $d_9 = 4.5831$    $n_6 = 1.51633$    $\nu_6 = 64.15$
$r_{10} = 39.3700$
    $d_{10} = 23.0312$
$r_{11} = \infty$ (intermediate image)
    $d_{11} = 11.9123$ -continued

| Embodiment 2 |
| --- |

$r_{12} = -48.5353$
    $d_{12} = 11.0187$    $n_7 = 1.53996$    $\nu_7 = 59.45$
$r_{13} = -28.3728$ (aspherical surface)
    $d_{13} = 0.5000$
$r_{14} = 74.6549$
    $d_{14} = 4.6647$    $n_8 = 1.76182$    $\nu_8 = 26.52$
$r_{15} = 30.9840$
    $d_{15} = 16.8967$    $n_9 = 1.60311$    $\nu_9 = 60.68$
$r_{16} = -71.4032$
    $d_{16} = 0.5000$
$r_{17} = 29.0223$
    $d_{17} = 10.0396$    $n_{10} = 1.77250$    $\nu_{10} = 49.60$
$r_{18} = 101.1388$
    $d_{18} = 17.5000$
$r_{19} = \infty$ (eye point)
aspherical surface coefficients
$K = 0$, $E = 4.8343 \times 10^{-6}$, $F = 3.4230 \times 10^{-10}$,
$G = 5.4239 \times 10^{-13}$
$f_1 = -229.063$, $f_2 = 24.683$, $f_{2e} = 49.675$, $d = 34.944$,
$r_e = 101.139$, $f_{2e}/f = 2.169$, $f/f_1 = -0.100$, $d/f = 1.526$,
$f/r_e = 0.226$

| Embodiment 3 |
| --- |

$f = 23.170$, $2\omega = 80°$, pupil diameter 6 mm
$r_1 = 85.7692$
    $d_1 = 10.5670$    $n_1 = 1.51633$    $\nu_1 = 64.15$
$r_2 = -85.0851$
    $d_2 = 3.8913$    $n_2 = 1.62004$    $\nu_2 = 36.26$
$r_3 = -1903.3425$
    $d_3 = 31.7740$
$r_4 = \infty$
    $d_4 = 72.6750$    $n_3 = 1.56883$    $\nu_3 = 56.33$
$r_5 = \infty$
    $d_5 = 2.0500$
$r_6 = \infty$
    $d_6 = 100.6800$    $n_4 = 1.56883$    $\nu_4 = 56.33$
$r_7 = \infty$
    $d_7 = 1.5000$
$r_8 = 164.2153$
    $d_8 = 5.4696$    $n_5 = 1.80518$    $\nu_5 = 25.43$
$r_9 = -141.9611$
    $d_9 = 2.0000$
$r_{10} = -71.6276$
    $d_{10} = 4.6492$    $n_6 = 1.51633$    $\nu_6 = 64.15$
$r_{11} = 74.1632$
    $d_{11} = 22.9127$
$r_{12} = \infty$ (intermediate image)
    $d_{12} = 11.9123$
$r_{13} = -69.3973$
    $d_{13} = 11.3834$    $n_7 = 1.53996$    $\nu_7 = 59.45$
$r_{14} = -31.6360$ (aspherical surface)
    $d_{14} = 0.5000$
$r_{15} = 132.5091$
    $d_{15} = 16.2089$    $n_8 = 1.60311$    $\nu_8 = 60.68$
$r_{16} = -24.8370$
    $d_{16} = 4.0703$    $n_9 = 1.76182$    $\nu_9 = 26.52$
$r_{17} = -54.3046$
    $d_{17} = 0.5000$
$r_{18} = 27.3079$
    $d_{18} = 10.0396$    $n_{10} = 1.77250$    $\nu_{10} = 49.60$
$r_{19} = 101.1388$
    $d_{19} = 17.5000$
$r_{20} = \infty$ (eye point)
aspherical surface coefficients
$K = 0$, $E = 4.3430 \times 10^{-6}$, $F = 3.3300 \times 10^{-10}$,
$G = 5.3900 \times 10^{-13}$
$f_1 = -322.955$, $f_2 = 24.067$, $f_{2e} = 45.716$, $d = 34.825$,
$r_e = 101.139$, $f_{2e}/f = 1.973$, $f/f_1 = -0.072$, $d/f = 1.503$,
$f/r_e = 0.229$

Embodiment 4 f = 22.823, 2ω = 80°, pupil diameter 6 mm
$r_1 = 114.1340$
$\quad d_1 = 10.2575 \quad n_1 = 1.51633 \quad \nu_1 = 64.15$
$r_2 = -76.5130$
$\quad d_2 = 3.5274 \quad n_2 = 1.62004 \quad \nu_2 = 36.26$
$r_3 = -267.3670$
$\quad d_3 = 20.6350$
$r_4 = \infty$
$\quad d_4 = 76.5700 \quad n_3 = 1.56883 \quad \nu_3 = 56.33$
$r_5 = \infty$
$\quad d_5 = 1.0000$
$r_6 = \infty$
$\quad d_6 = 110.7480 \quad n_4 = 1.56883 \quad \nu_4 = 56.33$
$r_7 = \infty$
$\quad d_7 = 1.5000$
$r_8 = 107.3321$
$\quad d_8 = 8.9831 \quad n_5 = 1.80518 \quad \nu_5 = 25.43$
$r_9 = -174.3596$
$\quad d_9 = 7.4081 \quad n_6 = 1.51633 \quad \nu_6 = 64.15$
$r_{10} = 25.8883$
$\quad d_{10} = 21.8039$
$r_{11} = \infty$ (intermediate image)
$\quad d_{11} = 10.6825$
$r_{12} = -1500.0000$
$\quad d_{12} = 13.6501 \quad n_7 = 1.49241 \quad \nu_7 = 57.66$
$r_{13} = -29.7469$ (aspherical surface)
$\quad d_{13} = 0.5000$
$r_{14} = 202.6314$
$\quad d_{14} = 16.8972 \quad n_8 = 1.60311 \quad \nu_8 = 60.68$
$r_{15} = -28.4542$
$\quad d_{15} = 4.6652 \quad n_9 = 1.76182 \quad \nu_9 = 26.52$
$r_{16} = -64.5619$
$\quad d_{16} = 0.5000$
$r_{17} = 30.8740$
$\quad d_{17} = 10.0400 \quad n_{10} = 1.77250 \quad \nu_{10} = 49.60$
$r_{18} = 101.0040$
$\quad d_{18} = 17.5000$
$r_{19} = \infty$ (eye point)
aspherical surface coefficients
$K = 0, E = 6.2622 \times 10^{-6}, F = -1.0587 \times 10^{-8},$
$G = 1.2588 \times 10^{-11}$
$f_1 = -108.495, f_2 = 26.038, f_{2e} = 54.181, d = 32.486,$
$r_e = 101.004, f_{2e}/f = 2.37, f/f_1 = -0.210, d/f = 1.423,$
$f/r_e = 0.226$

Embodiment 5 f = 21.578, apparent visual field = 80°,
maximum diameter of eyepiece system = 42.68
eye relief/maximum diameter of eyepiece system = 0.41
$r_1 = 98.3759$
$\quad d_1 = 5.0000 \quad n_1 = 1.51633 \quad \nu_1 = 64.15$
$r_2 = -78.3175$
$\quad d_2 = 2.5000 \quad n_2 = 1.64769 \quad \nu_2 = 33.79$
$r_3 = -290.3286$
$\quad d_3 = 61.4748$
$r_4 = \infty$
$\quad d_4 = 59.0000 \quad n_3 = 1.56883 \quad \nu_3 = 56.33$
$r_5 = \infty$
$\quad d_5 = 1.0000$
$r_6 = \infty$
$\quad d_6 = 62.0000 \quad n_4 = 1.56883 \quad \nu_4 = 56.33$
$r_7 = \infty$
$\quad d_7 = 1.3500$
$r_8 = 38.1133$
$\quad d_8 = 4.8058 \quad n_5 = 1.78472 \quad \nu_5 = 25.68$
$r_9 = 2.812 \times 10^4$
$\quad d_9 = 2.5000 \quad n_6 = 1.56384 \quad \nu_6 = 60.67$
$r_{10} = 20.0000$
$\quad d_{10} = 31.4509$
$r_{11} = -26.1967$
$\quad d_{11} = 7.0000 \quad n_7 = 1.77250 \quad \nu_7 = 49.60$
$r_{12} = -23.8861$
$\quad d_{12} = 0.5000$

Embodiment 5 (continued)

$r_{13} = 233.9115$ (aspherical surface)
$\quad d_{13} = 5.0000 \quad n_8 = 1.52542 \quad \nu_8 = 55.78$
$r_{14} = -105.1100$
$\quad d_{14} = 0.5000$
$r_{15} = 38.6426$
$\quad d_{15} = 3.000 \quad n_9 = 1.76182 \quad \nu_9 = 26.52$
$r_{16} = 23.2128$
$\quad d_{16} = 13.0000 \quad n_{10} = 1.60311 \quad \nu_{10} = 60.68$
$r_{17} = 818.6530$
$\quad d_{17} = 0.5000$
$r_{18} = 27.2355$
$\quad d_{18} = 8.0000 \quad n_{11} = 1.77250 \quad \nu_{11} = 49.60$
$r_{19} = 90.9036$
$\quad d_{19} = 17.5000$
$r_{20}$ eye point
aspherical surface coefficients
$K = 0, E = -5.0983 \times 10^{-6}, F = 0, G = 0, H = 0$
$f_2 = 22.030, f_{21} = 68.804, f_{23} = 47.724, \phi = -0.0838$
$f_2/f_{21} = 0.320, f_2/f_{23} = 0.462, f \cdot \phi = -1.809,$
$\nu_{22a} - \nu_{22b} = -34.16, n_{23} = 1.77250$

Embodiment 6 f = 21.576, apparent visual field 80°,
maximum diameter of eyepiece system = 42.46
eye relief/maximum diameter of eyepiece system = 0.412
$r_1 = 98.1138$
$\quad d_1 = 5.0000 \quad n_1 = 1.51633 \quad \nu_1 = 64.15$
$r_2 = -76.8753$
$\quad d_2 = 2.5000 \quad n_2 = 1.63980 \quad \nu_2 = 34.46$
$r_3 = -296.5445$
$\quad d_3 = 61.3650$
$r_4 = \infty$
$\quad d_4 = 59.0000 \quad n_3 = 1.56883 \quad \nu_3 = 56.33$
$r_5 = \infty$
$\quad d_5 = 1.0000$
$r_6 = \infty$
$\quad d_6 = 62.0000 \quad n_4 = 1.56883 \quad \nu_4 = 56.33$
$r_7 = \infty$
$\quad d_7 = 1.3500$
$r_8 = 47.4956$
$\quad d_8 = 4.8058 \quad n_5 = 1.80518 \quad \nu_5 = 25.43$
$r_9 = -494.1686$
$\quad d_9 = 2.5000 \quad n_6 = 1.51633 \quad \nu_6 = 64.15$
$r_{10} = 21.3667$
$\quad d_{10} = 31.4509$
$r_{11} = -42.0000$
$\quad d_{11} = 7.0000 \quad n_7 = 1.77250 \quad \nu_7 = 49.60$
$r_{12} = -27.9589$
$\quad d_{12} = 0.5000$
$r_{13} = -71.6099$
$\quad d_{13} = 5.0000 \quad n_8 = 1.49241 \quad \nu_8 = 57.66$
$r_{14} = -53.7140$ (aspherical surface)
$\quad d_{14} = 0.5000$
$r_{15} = 39.9442$
$\quad d_{15} = 3.0000 \quad n_9 = 1.76182 \quad \nu_9 = 26.52$
$r_{16} = 22.4690$
$\quad d_{16} = 13.0000 \quad n_{10} = 1.60311 \quad \nu_{10} = 60.68$
$r_{17} = -602.3443$
$\quad d_{17} = 0.5000$
$r_{18} = 26.5134$
$\quad d_{18} = 8.0000 \quad n_{11} = 1.77250 \quad \nu_{11} = 49.60$
$r_{19} = 90.9036$
$\quad d_{19} = 17.5000$
$r_{20}$ eye point
aspherical surface coefficients
$K = 0, E = 4.0895 \times 10^{-6}, F = 0, G = 0, H = 0$
$f_2 = 22.258, f_{21} = 73.701, f_{23} = 45.965, \phi = -0.0565$
$f_2/f_{21} = 0.302, f_2/f_{23} = 0.4842, f \cdot \phi = -1.22$
$\nu_{22a} - \nu_{22b} = -34.16, n_{23} = 1.7725$

| Embodiment 7 |
| --- |

F = 21.729, apparent visual field 80°,
maximum diameter of eyepiece system = 43.858
eye relief/maximum diameter of eyepiece system = 0.399
$r_1 = 95.6023$
    $d_1 = 5.0000$    $n_1 = 1.51633$    $v_1 = 64.15$
$r_2 = -76.6162$
    $d_2 = 2.5000$    $n_2 = 1.63980$    $v_2 = 34.46$
$r_3 = -316.2649$
    $d_3 = 61.2070$
$r_4 = \infty$
    $d_4 = 59.0000$    $n_3 = 1.56883$    $v_3 = 56.33$
$r_5 = \infty$
    $d_5 = 1.0000$
$r_6 = \infty$
    $d_6 = 62.0000$    $n_4 = 1.56883$    $v_4 = 56.33$
$r_7 = \infty$
    $d_7 = 1.3500$
$r_8 = 40.0728$
    $d_8 = 4.8058$    $n_5 = 1.78472$    $v_5 = 25.68$
$r_9 = -247.1450$
    $d_9 = 2.5000$    $n_6 = 1.65160$    $v_6 = 58.55$
$r_{10} = 23.9583$
    $d_{10} = 31.4509$
$r_{11} = -23.9123$
    $d_{11} = 6.0000$    $n_7 = 1.77250$    $v_7 = 49.60$
$r_{12} = -24.1787$
    $d_{12} = 0.5000$
$r_{13} = -1024.5037$ (aspherical surface)
    $d_{13} = 6.0000$    $n_8 = 1.52542$    $v_8 = 55.78$
$r_{14} = -50.6901$
    $d_{14} = 0.5000$
$r_{15} = 37.7798$
    $d_{15} = 3.0000$    $n_9 = 1.76182$    $v_9 = 26.52$
$r_{16} = 23.0000$
    $d_{16} = 13.0000$    $n_{10} = 1.60311$    $v_{10} = 60.68$
$r_{17} = -7274.6882$
    $d_{17} = 0.5000$
$r_{18} = 28.8221$
    $d_{18} = 8.0000$    $n_{11} = 1.77250$    $v_{11} = 49.60$
$r_{19} = 90.9036$
    $d_{19} = 17.5000$
$r_{20}$ eye point
aspherical surface coefficients
K = 0, E = $-4.6022 \times 10^{-6}$, F = 0, G = 0, H = 0
$f_2 = 22.166$, $f_{21} = 71.697$, $f_{23} = 51.727$, $\phi = -0.0871$,
$f_2/f_{21} = 0.3092$, $f_2/f_{23} = 0.4285$, $f \cdot \phi = -1.893$
$v_{22a} - v_{22b} = -34.16$, $n_{23} = 1.7725$

| Embodiment 8 |
| --- | f = 20.287, apparent visual field = 80°,
maximum diameter of eyepiece system = 44.412,
eye relief/maximum diameter of eyepiece system = 0.394
$r_1 = 100.7299$
    $d_1 = 5.0000$    $n_1 = 1.51633$    $v_1 = 64.15$
$r_2 = -67.0152$
    $d_2 = 2.0000$    $n_2 = 1.62588$    $v_2 = 35.70$
$r_3 = -232.6163$
    $d_3 = 52.8406$
$r_4 = \infty$
    $d_4 = 59.0000$    $n_3 = 1.56883$    $v_3 = 56.33$
$r_5 = \infty$
    $d_5 = 1.0000$
$r_6 = \infty$
    $d_6 = 62.0000$    $n_4 = 1.56883$    $v_4 = 56.33$
$r_7 = \infty$
    $d_7 = 1.3500$
$r_8 = 178.9190$
    $d_8 = 4.8058$    $n_5 = 1.80518$    $v_5 = 25.43$
$r_9 = -67.1851$
    $d_9 = 2.0000$    $n_6 = 1.51633$    $v_6 = 64.15$
$r_{10} = 35.0000$ -continued

| Embodiment 8 |
| --- |

$d_{10} = 31.4509$
$r_{11} = -35.0000$
    $d_{11} = 7.0000$    $n_7 = 1.49241$    $v_7 = 57.66$
$r_{12} = -24.3679$ (aspherical surface)
    $d_{12} = 0.5000$
$r_{13} = 351.7893$
    $d_{13} = 6.9000$    $n_8 = 1.77250$    $v_8 = 49.60$
$r_{14} = -75.7851$
    $d_{14} = 0.5000$
$r_{15} = 104.0193$
    $d_{15} = 4.1987$    $n_9 = 1.76182$    $v_9 = 26.52$
$r_{16} = 27.5694$
    $d_{16} = 14.0000$    $n_{10} = 1.60311$    $v_{10} = 60.68$
$r_{17} = -80.8251$
    $d_{17} = 0.5000$
$r_{18} = 27.4270$
    $d_{18} = 8.0000$    $n_{11} = 1.77250$    $v_{11} = 49.60$
$r_{19} = 99.9036$
    $d_{19} = 17.5000$
$r_{20}$ eye point
aspherical surface coefficients
K = 0, E = $2.3014 \times 10^{-5}$, F = $-6.3562 \times 10^{-8}$,
    G = $1.4008 \times 10^{-10}$, H = $-8.7041 \times 10^{-14}$
$f_2 = 22.592$, $f_{21} = 49.399$, $f_{23} = 48.197$, $\phi = -0.0353$
$f_2/f_{21} = 0.4573$, $f_2/f_{23} = 0.4687$, $f \cdot \phi = -0.717$
$v_{22a} - v_{22b} = -34.16$, $n_{23} = 1.7725$

| Embodiment 9 |
| --- | f = 18.658, apparent visual field = 80°,
maximum diameter of eyepiece system = 43.12
eye relief/maximum diameter of eyepiece system = 0.406
$r_1 = 100.6994$
    $d_1 = 5.3000$    $n_1 = 1.51633$    $v_1 = 64.15$
$r_2 = -60.4070$
    $d_2 = 2.6000$    $n_2 = 1.64769$    $v_2 = 33.79$
$r_3 = -167.9972$
    $d_3 = 37.4148$
$r_4 = \infty$
    $d_4 = 58.0000$    $n_3 = 1.56883$    $v_3 = 56.33$
$r_5 = \infty$
    $d_5 = 2.5000$
$r_6 = \infty$
    $d_6 = 58.0000$    $n_4 = 1.56883$    $v_4 = 56.33$
$r_7 = \infty$
    $d_7 = 3.0000$
$r_8 = 41.6878$
    $d_8 = 5.5000$    $n_5 = 1.78472$    $v_5 = 25.68$
$r_9 = -58.1795$
    $d_9 = 3.0000$    $n_6 = 1.65844$    $v_6 = 50.88$
$r_{10} = 19.0010$
    $d_{10} = 19.5000$
$r_{11} = -28.2685$
    $d_{11} = 7.0000$    $n_7 = 1.74320$    $v_7 = 49.34$
$r_{12} = -23.6840$
    $d_{12} = 1.0000$
$r_{13} = -250.0000$ (aspherical surface)
    $d_{13} = 5.0000$    $n_8 = 1.52542$    $v_8 = 55.78$
$r_{14} = -52.6571$
    $d_{14} = 0.5000$
$r_{15} = 45.6621$
    $d_{15} = 3.0000$    $n_9 = 1.78472$    $v_9 = 25.68$
$r_{16} = 23.7540$
    $d_{16} = 13.0000$    $n_{10} = 1.65844$    $v_{10} = 50.88$
$r_{17} = \infty$
    $d_{17} = 0.5000$
$r_{18} = 27.2871$
    $d_{18} = 8.0000$    $n_{11} = 1.74320$    $v_{11} = 49.34$
$r_{19} = 108.4810$
    $d_{19} = 17.5000$
$r_{20}$ = eye point
aspherical surface coefficients -continued Embodiment 9

K = 0, E = −4.8802 × 10⁻⁶, F = 0, G = 0, H = 0
$f_2 = 21.303$, $F_{21} = 59.367$, $f_{23} = 47.077$, $\phi = -0.0896$
$f_2/f_{21} = 0.359$, $f_2/f_{23} = 0.453$, $f \cdot \phi = -1.672$
$V_{22a} - V_{22b} = -25.2$, $n_{23} = 1.7432$
$\{(\phi_{22a}/v_{22a}) / (\phi_{22b}/v_{22b})\} = -1.066$, $\Phi_{22} \cdot f = 0.224$
$\alpha_{22a} - \alpha_{22b} = 21$, AVE $(n_{22a}, n_{22b}) = 1.72158$, $f/f_1 = -0.195$ wherein the reference symbols $r_1, r_2, \ldots$ represent radii of curvature on surfaces of respective lenses, the reference symbols $d_1, d_2, \ldots$ designate thicknesses of the respective lenses and airspaces reserved therebetween, the reference symbols $n_1, n_2, \ldots$ denote refractive indices of the respective lenses, and the reference symbols $v_1, v_2, \ldots$ represent Abbe's numbers of the respective lenses. Lengths are expressed in a unit of millimeter.

The first embodiment has a composition illustrated in FIG. 1, wherein the reference symbols $r_1$ through $r_3$ represents an objective lens system O, the reference symbols $r_4$ through $r_5$ and $r_6$ through $r_7$ designate prisms P and the reference symbols $r_8$ through $r_{10}$ denote the eyepiece system according to the present invention: the reference symbols $r_8$ through $r_{10}$ representing the first lens unit $G_1$, the reference symbols $r_{12}$ through $r_{10}$ designating the second lens unit $G_2$, the reference symbol $r_{11}$ denoting an intermediate image formed by the objective lens system O and the reference symbol $r_{19}$ being an eye point.

In the eyepiece system preferred as the first embodiment, the first lens unit $G_1$ is composed of a cemented lens component which consists of a positive lens element and a negative lens element, whereas the second lens unit $G_2$ is composed of three positive lens components, i.e., the first, second and third lens components $G_{21}$, $G_{22}$ and $G_{23}$: the second lens component $G_{22}$ being a cemented lens component. Speaking more concretely, the second lens unit $G_2$ is composed of the first positive lens component $G_{21}$ which is a meniscus lens component having a concave surface on the side of the objective lens system, the second positive lens component $G_{22}$ which is a biconvex cemented lens component consisting of a positive lens element and a negative lens element, and the third positive lens component $G_{23}$ which is a meniscus lens component having a concave surface on the side of the observer. The third lens component $G_{23}$ of the second lens unit is disposed on the side of the eye. An object side surface of the first lens component $G_{21}$ of the second lens unit $G_2$ is configured as an aspherical surface and the positive meniscus lens component $G_{21}$ of the first lens component $G_{21}$ is made of a plastic material.

The first embodiment satisfies the conditions (1), (2), (3) and (4). Further, the first embodiment satisfies the conditions (2-1), (2-2) and (3-1).

Figure 2:
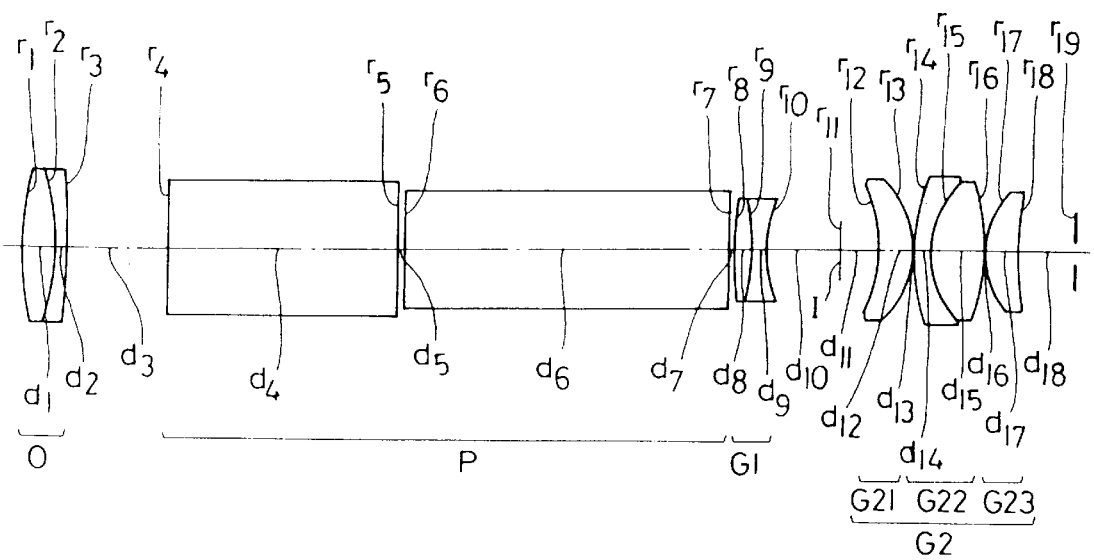

The second embodiment has a composition shown in FIG. 2 which is similar to that of the eyepiece system preferred as the first embodiment. The second embodiment satisfies the conditions (1), (2), (3) and (4), and further satisfies the conditions (1-1), (2-1), (2-2) and (4-1).

Figure 3:
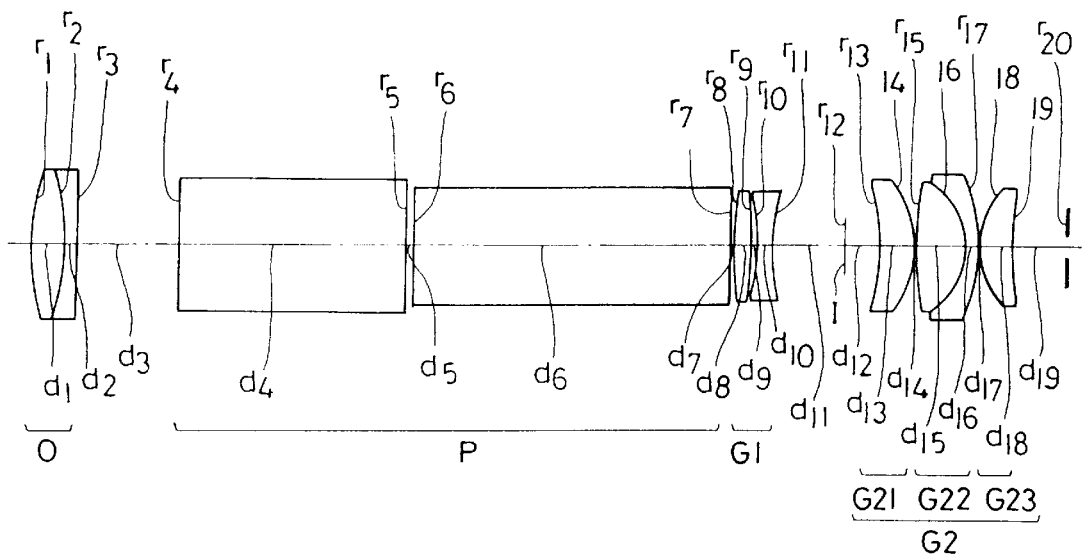

The third embodiment is a lens system which is composed as shown in FIG. 3. Differently from the first embodiment, the lens system preferred as the third embodiment uses a first lens unit $G_1$ composed of a positive lens element and a negative lens element which are separated from each other. Speaking more concretely of the third embodiment, the first lens unit $G_1$ is composed of a biconvex lens element represented by the reference symbols $r_8$ through $r_9$ and a biconcave lens element designated by the reference symbols $r_{10}$ through $r_{11}$, whereas a second lens unit $G_2$ is composed of a first lens component $G_{21}$ which is a positive meniscus lens component represented by the reference symbols $r_{13}$ through $r_{14}$, a second lens component $G_{22}$ which is a cemented lens component consisting of a positive lens element designated by the reference symbols $r_{15}$ through $r_{16}$ and a negative meniscus lens element denoted by the reference symbols $r_{16}$ through $r_{17}$, and a third lens component $G_{23}$ which is a positive meniscus lens component represented by the reference symbols $r_{18}$ through $r_{19}$. The third lens component $G_{23}$ is disposed on the eye side. Further, the reference symbol $r_{12}$ represents an intermediate image formed by an objective lens system and the reference symbol $r_{20}$ designates an eye point.

The third embodiment satisfies the conditions (1), (2), (3) and (4). It also satisfies the conditions (1-1), (2-1), (3-1) and (4-1).

Figure 4:
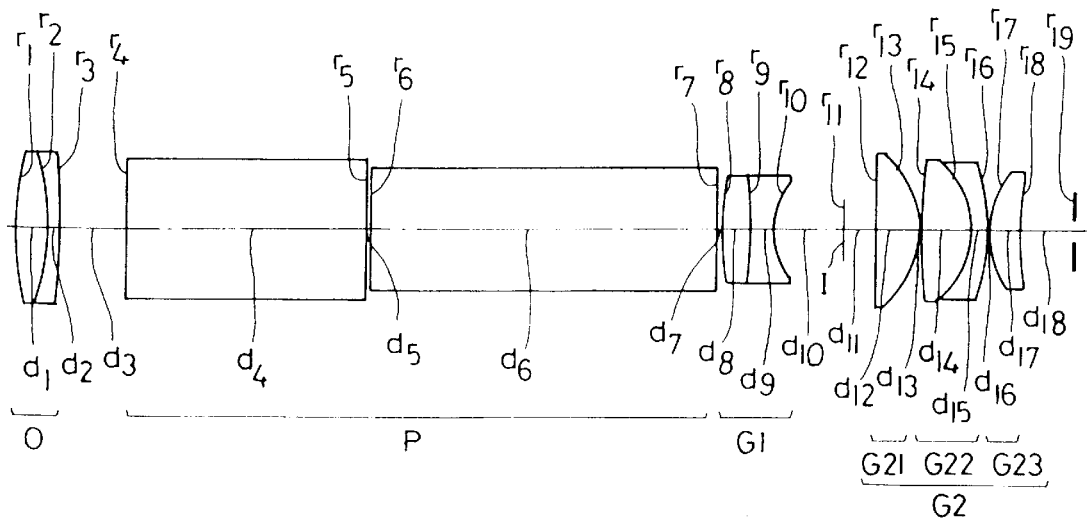

The fourth embodiment has a composition illustrated in FIG. 4 which is similar to that of the eyepiece system preferred as the first embodiment.

The fourth embodiment satisfies the conditions (1), (2), (3) and (4). It also satisfies the conditions (3-1) and (4-1).

Figure 5:
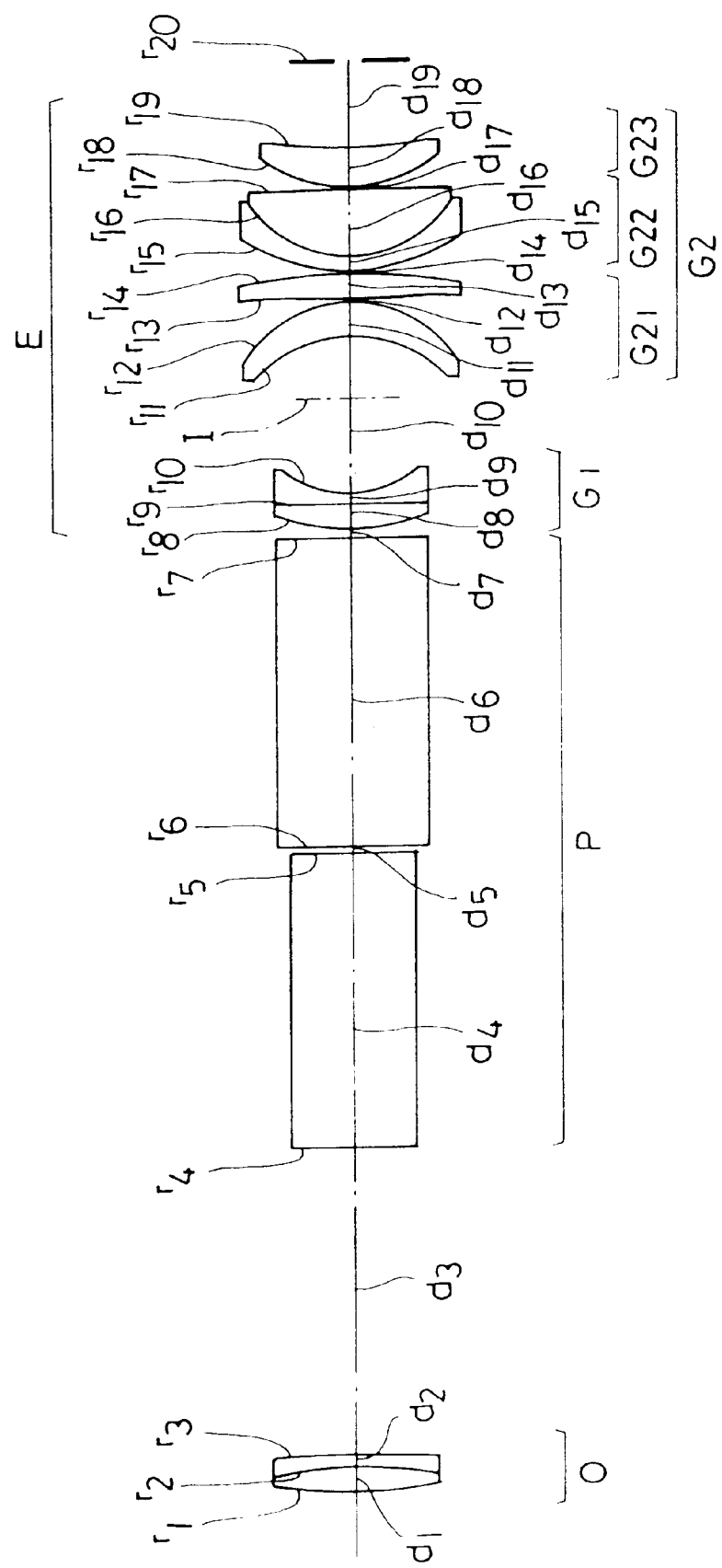

The fifth embodiment is composed, in order from the object side as shown in FIG. 5, of a first lens unit $G_1$ ($r_8$ through $r_{10}$) having a negative refractive power and a second lens unit $G_2$ ($r_{11}$ through $r_{19}$) having a positive refractive power. The second lens unit $G_2$ is composed of a first lens component $G_{21}$ ($r_{11}$ through $r_{14}$) which consists of a positive meniscus lens element having a concave surface on the side of an objective lens system O and a biconvex lens element, a second lens component $G_{22}$ ($r_{15}$ through $r_{17}$) which is composed of a cemented lens component consisting of a negative lens element and a positive lens element, and a third lens component $G_{23}$ ($r_{,,}$ through $r_{19}$) which is a positive meniscus lens component. The reference symbol O represents an objective lens system, the reference symbol P designates prisms and the reference symbol E denotes the eyepiece system. Further, an intermediate image surface I is located between the first lens unit $G_1$ and the second lens unit $G_2$. Furthermore, an object side surface $r_{13}$ of a biconvex lens element which is disposed on the eye side in the first lens component $G_{21}$ of the second lens unit is configured as an aspherical surface.

Figure 6:
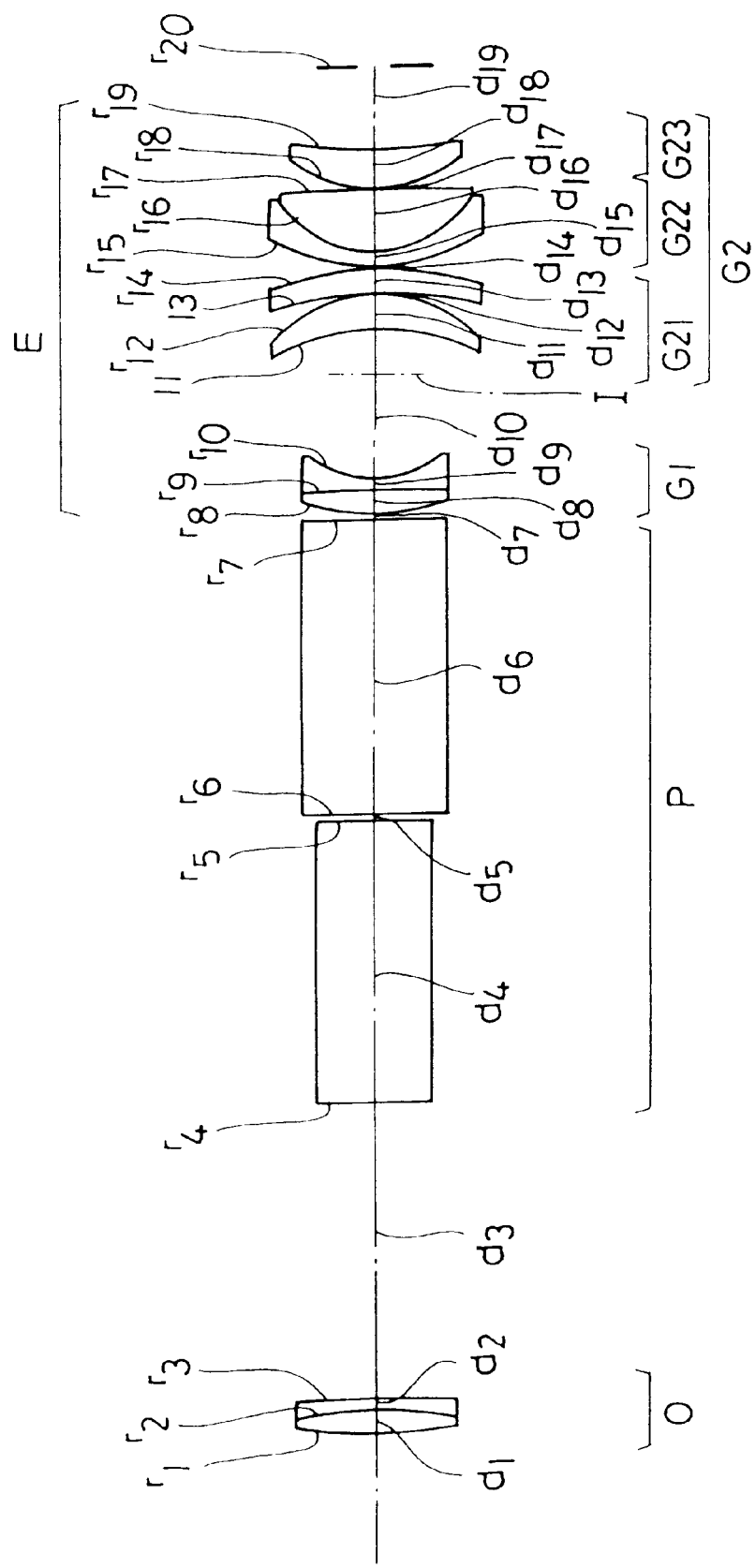

The sixth embodiment has a composition illustrated in FIG. 6 which is similar to that of the fifth embodiment. In the fifth embodiment, an eye side surface $r_{14}$ of a meniscus lens element $G_{21}$ which is disposed on the eye side in a second lens unit is configured as an aspherical surface.

Figure 7:
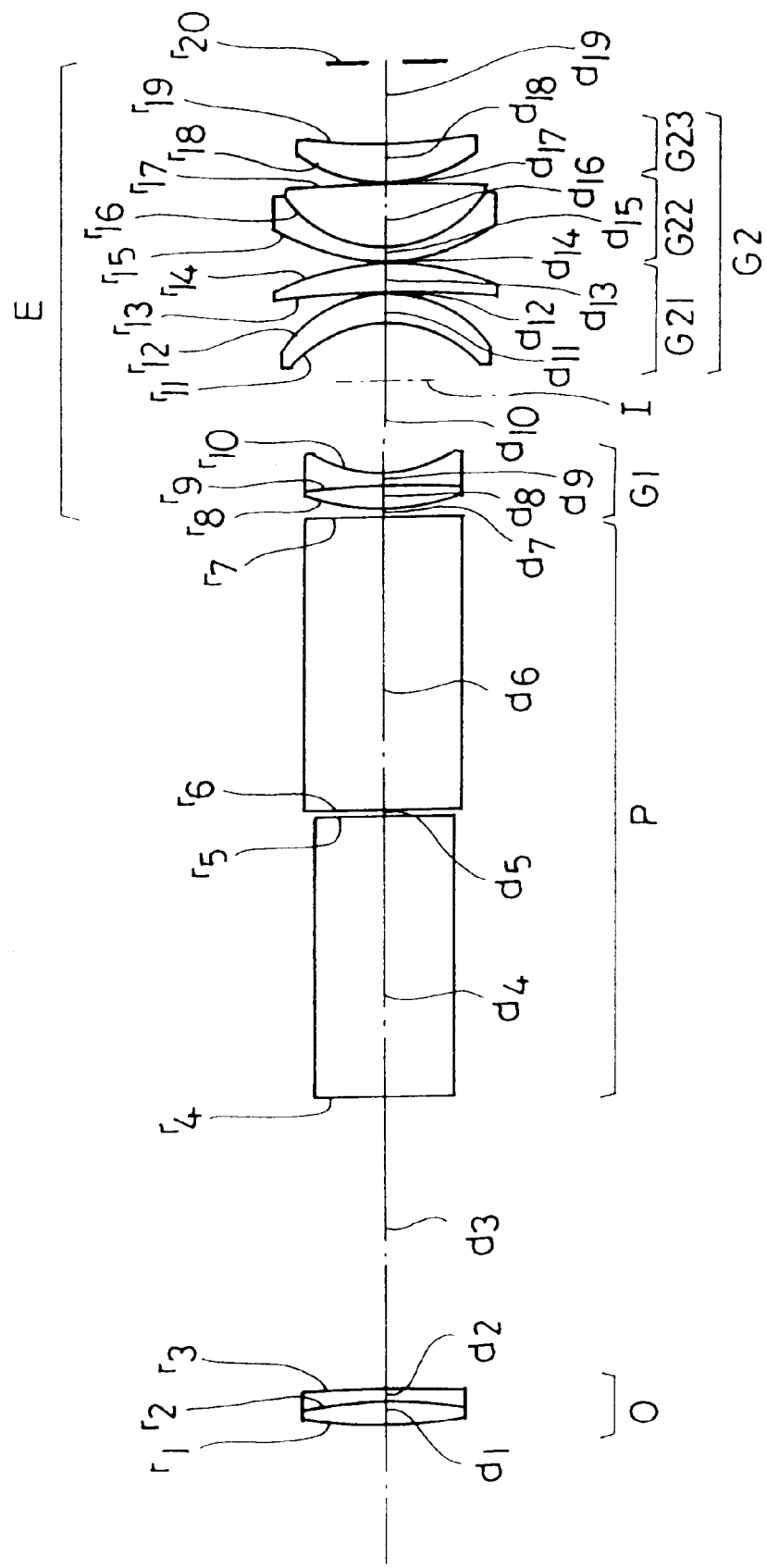

The seventh embodiment is composed as illustrated in FIG. 7, or has a composition which is also similar to that of the fifth embodiment. In the seventh embodiment, an object side surface $r_{13}$ of a meniscus lens element which is disposed on the eye side in a first lens component $G_{21}$ of a second lens unit is configured as an aspherical surface.

Figure 8:
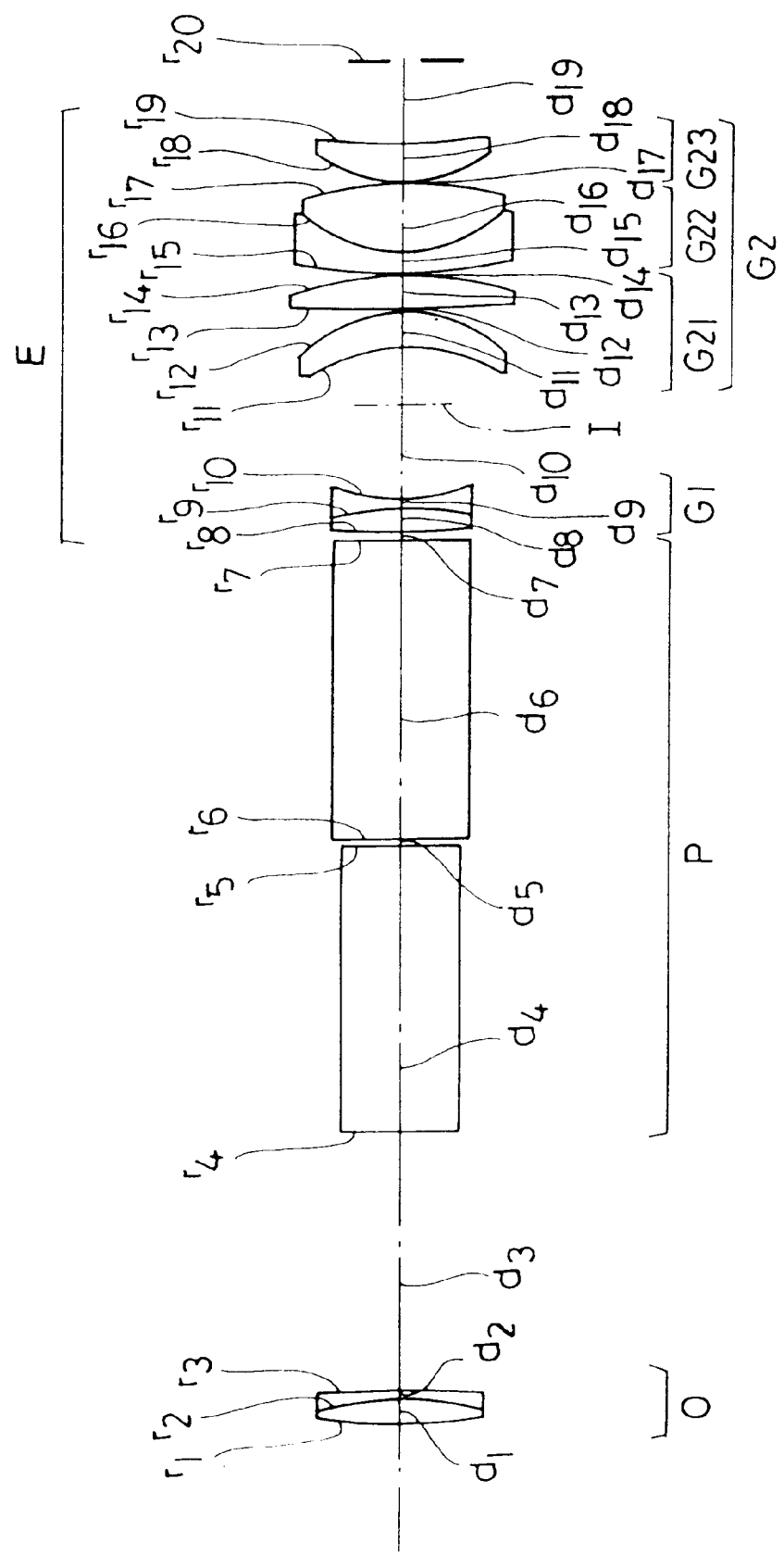
Figure 9:
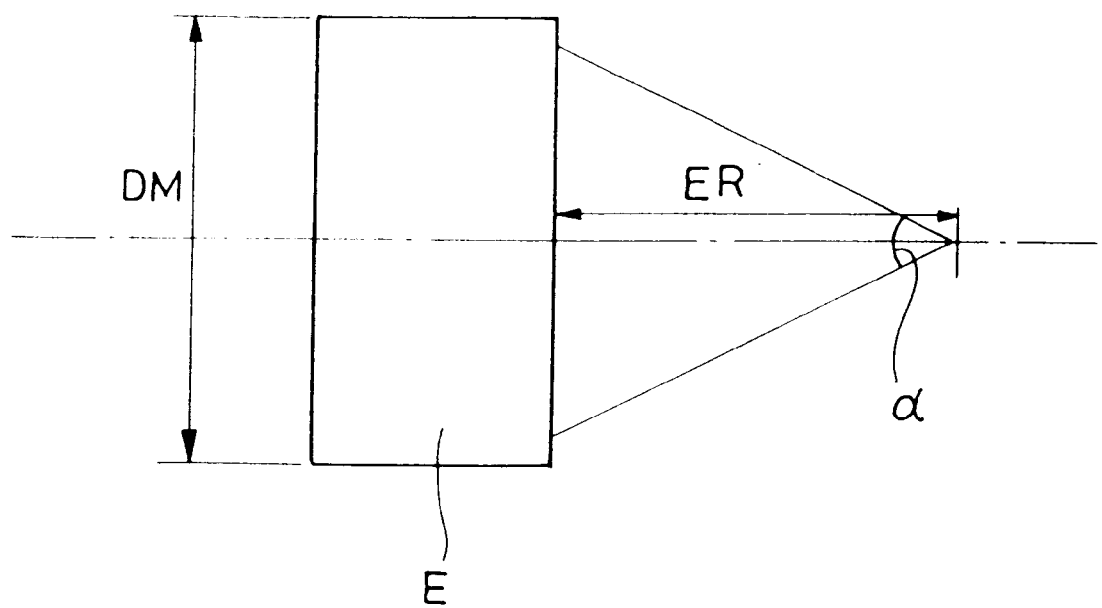
FIG. 9 shows a diagram illustrating relationship between an eye relief and a diameter of an eyepiece system.

The eighth embodiment has a composition illustrated in FIG. 8, which is also similar to that of the fifth embodiment. In the eighth embodiment, an eye side surface $r_{12}$ of a meniscus lens element disposed on a side of an objective lens system in a lens component $G_{21}$ of a second lens unit is configured as an aspherical surface.

Figure 10:
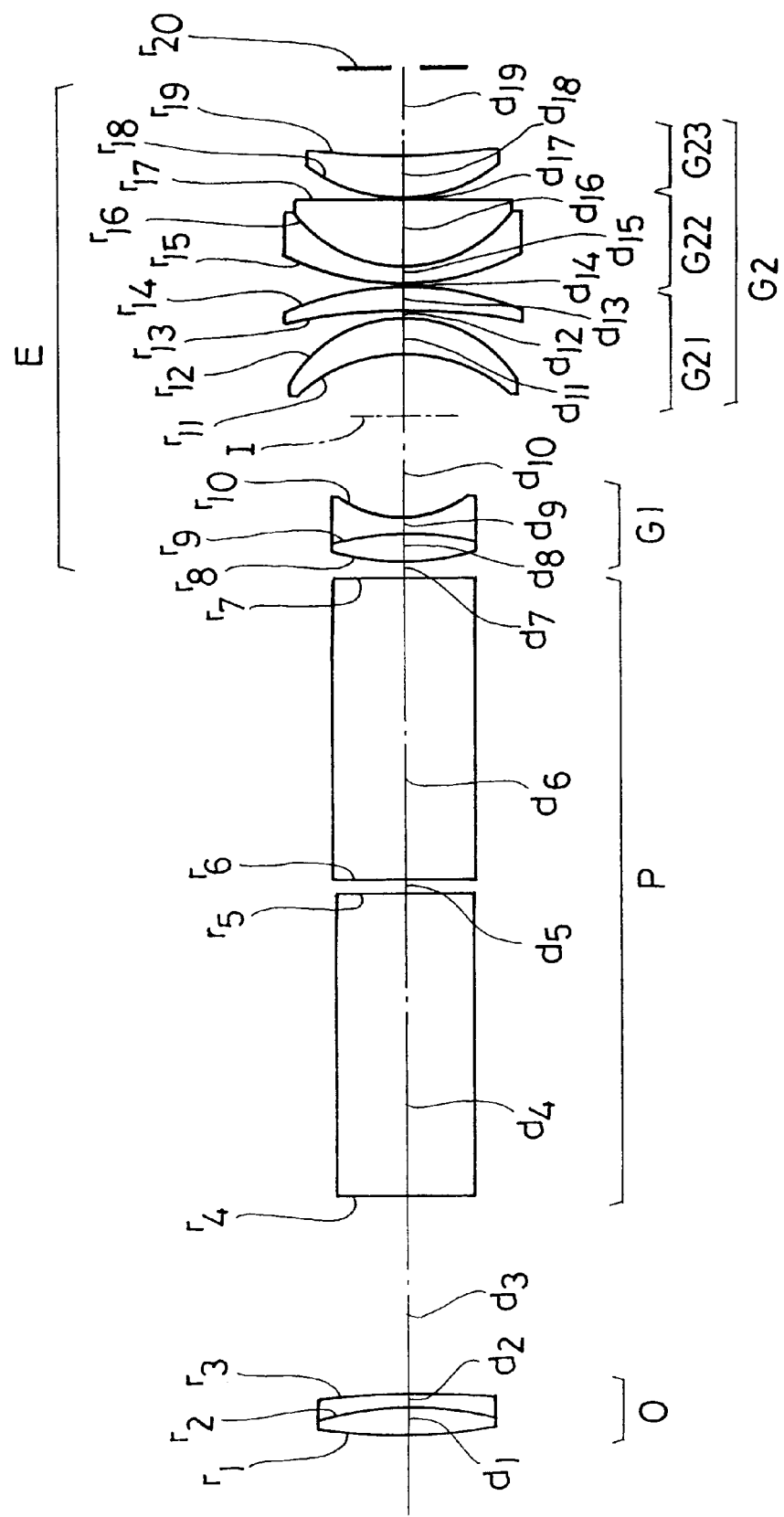
FIG. 10 shows a sectional view illustrating composition of tenth embodiment of the eyepiece system according to the present invention.

The ninth embodiment has a composition illustrated in FIG. 10 which is similar to that of the second embodiment. In the ninth embodiment, an eye side surface of the positive meniscus lens element disposed on the eye side in the second lens component $G_{21}$ of the second lens unit $G_2$ is configured as an aspherical surface.

When a direction along the optical axis is taken as the x axis and a direction perpendicular to the optical axis is taken as the y axis, a shape of the aspherical surface used in each of the embodiments is expressed by the following formula:

$$x=(y^2/r)/[1+\{1-(1+k)(y/r)^2\}^{1/2}]+Ey^4+Fy^6+Gy^8+Hy^{10}+$$

wherein the reference symbol r represents a radius of curvature on a reference sphere, the reference symbol k designates a conical constant, and the reference symbols E, F, G, H, . . . denote aspherical surface coefficients.

Each of the eyepiece systems preferred as the embodiments has a wide apparent visual field, a long eye relief and a small diameter. That is to say, the eyepiece system has a high ratio of an eye relief relative to a maximum diameter thereof.

In the sectional view illustrating each of the embodiments, the eyepiece system is shown in a condition where it is combined with an objective lens system, and the reference symbol O represents an objective lens system, the reference symbol P designates prisms, the reference symbol E denotes the eyepiece system and the reference symbol I represents an intermediate image surface.

The eyepiece system according to the present invention has an extremely wide apparent visual field of 80° and an eye relief which is required and sufficient, can cope with large pupil diameters on the order of 6 mm, and corrects aberrations favorably even at marginal portions of the visual field.

I claim:

1. An eye piece system comprising in order from the object side:

a first lens unit having a negative refractive power; and a second lens unit having a positive refractive power, wherein said eyepiece system is configured so as to locate an intermediate image formed by an objective lens system between said first lens unit and said second lens unit, and wherein said second lens unit comprises a first lens component which comprises a positive meniscus lens element having a concave surface on the object side and at least one positive lens element, and has a positive refractive power as a whole, a second lens component which comprises a cemented lens component consisting of a negative lens element and a positive lens element, and has a positive refractive power, and a third lens component which comprises a positive lens element having an object side surface having a strong refractive power and has a positive refractive power, said eyepiece system satisfying the following conditions:

$$-3.0<\{(\phi_{22a}/\nu_{22a})/(\phi_{22b}/\nu_{22b})\}<-1.01$$

$$0.10<\phi_{22}\cdot f<0.40$$

wherein the reference symbol $\phi_{22}$ represents a refractive power of the second lens component disposed in the second lens unit, the reference symbol $\phi_{22a}$ designates a refractive power of the negative lens element of the cemented lens component used as the second lens component disposed in the second lens unit, the reference symbol $\phi_{22b}$ denotes a refractive power of the positive lens element of the cemented lens component used as the second lens component disposed in the second lens unit, the reference symbol $\nu_{22a}$ represents an Abbe's number of the negative lens element of the cemented lens component used as the second lens component disposed in the second lens unit, the reference symbol $\nu_{22b}$ designates an Abbe's number of the positive lens element of the cemented lens component disposed in the second lens unit and the reference symbol f denotes a focal length of the eyepiece system as a whole.

2. An eye piece system comprising in order from the object side:

a first lens unit having a negative refractive power; and a second lens unit having a positive refractive power, wherein said eyepiece system is configured so as to locate an intermediate image formed by an objective lens system between said first lens unit and said second lens unit, and wherein said second lens unit comprises a first lens component which comprises a positive meniscus lens element having a concave surface on the object side and at least one positive lens element, and has a positive refractive power as a whole, a second lens component which comprises a cemented lens component consisting of a negative lens element and a positive lens element, and has a positive refractive power, and a third lens component which comprises a positive lens element having an object side surface having a strong refractive power and has a positive refractive power, said eyepiece system satisfying the following conditions:

$$\alpha_{22a}-\alpha_{22b}<30$$

$$1.65<\text{AVE }(n_{22a}, n_{22b})<1.93$$

wherein the reference symbol $\alpha_{22a}$ represents a mean linear expansion coefficient of a glass material for the negative lens element of the cemented lens component used as the second lens component disposed in the second lens unit, the reference symbol $\alpha_{22b}$ designates a mean linear expansion coefficient of a glass material for the positive lens element of the cemented lens component used as the second lens component disposed in the second lens unit, the reference symbol $n_{22a}$ denotes a refractive index of the negative lens element of the cemented lens component disposed in the second lens unit, the reference symbol $n_{22b}$ represents a refractive index of the positive lens element of the cemented lens component used as the second lens component disposed in the second lens unit and the reference symbol AVE $(n_{22a}, n_{22b})$ designates a mean value of $n_{22a}$ and $n_{22b}$.

3. An eye piece system comprising in order from the object side:

a first lens unit having a negative refractive power; and a second lens unit having a positive refractive power, wherein said eyepiece system is configured so as to locate an intermediate image formed by an objective lens system between said first lens unit and said second lens unit, and wherein said second lens unit comprises a first lens component which comprises a positive meniscus lens element having a concave surface on the object side and at least one positive lens element, and has a positive refractive power as a whole, a second lens component which comprises a cemented lens component consisting of a negative lens element and a positive lens element, and has a positive refractive power, and a third lens component which comprises a positive lens element having an object side surface having a strong refractive power and has a positive refractive power, said eyepiece system satisfying the following condition:

$$-0.25 < f/f_1 < -0.05$$

wherein the reference symbol $f_1$ represents a focal length of the first lens unit and the reference symbol f designates a focal length of the eyepiece system as a whole.

4. An eyepiece system according to claim 1, 2 or 3 satisfying the following conditions (5), (6), (7), (8) and (9):

$$0.2 < f_2/f_{21} < 0.6$$

$$0.35 < f_2/f_{23} < 0.55$$

$$-3.0 < f \cdot \phi < -0.4$$

$$\nu_{22a} - \nu_{22b} < -25.0$$

$$n_{23} > 1.65$$

wherein the reference symbol $f_2$ represents a focal length of said second lens unit, the reference symbol $f_{21}$ designates a focal length of the first lens component disposed in said second lens unit, the reference symbol $f_{23}$ denotes a focal length of the third lens component disposed in said second lens unit, the reference symbol f represents a focal length of said eyepiece system as a whole, the reference symbol $\phi$ designates a refractive power of an air lens formed between said first lens unit and said second lens unit, the reference symbol $\nu_{22a}$ denotes an Abbe's number of the negative lens element of the cemented lens component of the second lens component disposed in said second lens unit, the reference symbol $\nu_{22b}$ represents an Abbe's number of the positive lens element of the cemented lens component of the second lens component disposed in said second lens unit, and the reference symbol $n_{23}$ designates a refractive index of the positive lens element which has the object side surface having the strong refractive power which is disposed in the third lens component of said second lens unit.

* * * * *